United States Patent
Suwald (10) Patent No.: US 10,824,821 B2
(45) Date of Patent: Nov. 3, 2020

(54) METHOD FOR PROVIDING A CODE PATTERN

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/361,409

(22) Filed: Mar. 22, 2019

(65) Prior Publication Data

US 2019/0325172 A1 Oct. 24, 2019

(30) Foreign Application Priority Data

Apr. 20, 2018 (EP) .................................... 18168435

(51) Int. Cl.
| | | |
|---|---|---|
| *G06K 1/04* | (2006.01) | |
| *G06K 1/02* | (2006.01) | |
| *G06K 19/06* | (2006.01) | |
| *G06K 19/077* | (2006.01) | |

(52) U.S. Cl.
CPC .............. *G06K 1/04* (2013.01); *G06K 1/025* (2013.01); *G06K 19/06037* (2013.01); *G06K 19/0772* (2013.01)

(58) Field of Classification Search
CPC .... G06K 1/04; G06K 1/025; G06K 19/06009; G06K 19/06037; G06K 19/06121; G06K 1/121
See application file for complete search history.

(56) References Cited

U.S. PATENT DOCUMENTS

| | | | |
|---|---|---|---|
| 4,745,269 A * | 5/1988 | Van Gils | ............... B07C 5/3412 |
| | | | 235/454 |
| 5,726,435 A | 3/1998 | Hara et al. | |
| 7,032,823 B2 | 4/2006 | Nojiri | |
| 8,031,375 B2 | 10/2011 | Yoshida | |
| 8,678,296 B2 * | 3/2014 | Lin | ................... G06K 19/06037 |
| | | | 235/454 |
| 9,298,932 B2 | 3/2016 | Dougharty et al. | |
| 2016/0306463 A1 | 10/2016 | Shim et al. | |
| 2017/0200035 A1 | 7/2017 | Teraura | |
| 2018/0174007 A1 * | 6/2018 | Imamura | ............... B23K 26/362 |
| 2019/0080127 A1 * | 3/2019 | Yoshida | ................... G06K 7/12 |
| 2019/0272363 A1 | 9/2019 | Suwald | |

FOREIGN PATENT DOCUMENTS

| | | | |
|---|---|---|---|
| EP | 2876576 A1 | 5/2015 | |
| EP | 2479650 B1 | 9/2015 | |
| EP | 2618287 B1 | 1/2017 | |
| WO | PCT-2007/110486 A1 | 10/2007 | |

* cited by examiner

*Primary Examiner* — Laura A Gudorf (57) ABSTRACT

In accordance with a first aspect of the present disclosure, a method for providing a code pattern which is readable by a sensor is conceived, the method comprising: defining a plurality of coding positions as a subset of positions in a two-dimensional matrix; including in said subset a plurality of positions which are diagonally adjacent to each other; selectively creating coding marks, such as coding dots, at the coding positions. In accordance with a second aspect of the present disclosure, a corresponding code pattern is provided.

15 Claims, 8 Drawing Sheets

102
Defining a plurality of coding positions as a subset of positions in a two-dimensional matrix

104
Including in said subset a plurality of positions which are diagonally adjacent to each other

106
Selectively creating coding marks, such as coding dots, on the coding positions

METHOD FOR PROVIDING A CODE PATTERN

OVERVIEW

The present disclosure relates to a method for providing a code pattern which is readable by a sensor. Furthermore, the present disclosure relates to a corresponding code pattern.

Fingerprint sensing devices, such as optical, acoustic and capacitive fingerprint sensors, may be integrated into user authentication tokens, for example into smart cards. In order to personalize such a user authentication token, fingerprint reference data should be enrolled into the user authentication token. More specifically, a fingerprint template should be stored in a secure element of the token, so that—in operation—a captured fingerprint can be compared with said template in order to authenticate a user. A secure element may for example be an embedded chip, more specifically a tamper-resistant integrated circuit with installed or pre-installed smart-card-grade applications, for instance payment applications, which have a prescribed functionality and a prescribed level of security. Furthermore, a secure element may implement security functions, such as cryptographic functions and authentication functions.

The enrolment of fingerprint reference data is often performed under supervision in a secure environment, for example at the premises of a bank. This process is often not user-friendly and time-consuming. Thus, it is desirable to facilitate enrolling fingerprint reference data into user authentication tokens of the kind set forth. For this purpose, a personal unlock key (PUK) may be provided to a user, so that the user can unlock an enrolment function of the user authentication token. Such a PUK may be a code pattern that can be read by the fingerprint sensor and verified by the secure element. Upon a positive verification, the secure element may allow the enrolment of a fingerprint template. It may be difficult, however, to provide a reliable code pattern which is also mechanically robust.

SUMMARY

In accordance with a first aspect of the present disclosure, a method for providing a code pattern which is readable by a sensor is conceived, the method comprising: defining a plurality of coding positions as a subset of positions in a two-dimensional matrix; including in said subset a plurality of positions which are diagonally adjacent to each other; selectively creating coding marks, such as coding dots, at the coding positions.

In an embodiment, the method further comprises creating orientation marks at predefined orientation mark positions in the matrix.

In an embodiment, the predefined orientation mark positions are positions in one or more corners of the matrix.

In an embodiment, the method further comprises logically grouping a predefined number of coding positions in one or more coding fields.

In an embodiment, the predefined number of coding positions in each coding field is p−1, wherein p represents the base of a Galois field $GF(p^n)$, and wherein n is the number of coding fields in the matrix.

In an embodiment, at most one coding mark is created in each coding field.

In an embodiment, the method further comprises logically grouping a predefined number of coding positions in a check number field.

In an embodiment, the predefined number of coding positions in the check number field is p, wherein p represents the base of a Galois field $GF(p^n)$, and wherein n is the number of coding fields in the matrix.

In an embodiment, the check number field is placed in the center of the matrix.

In an embodiment, the matrix is provided on a substrate, and the coding marks are created by creating cavities in said substrate.

In an embodiment, the matrix is provided on a substrate, and the coding marks are created by punching holes in said substrate.

In an embodiment, the substrate comprises an aluminum tape or an aluminum sheet.

In an embodiment, the sensor is an optical fingerprint sensor, an acoustic fingerprint sensor, or a capacitive fingerprint sensor.

In an embodiment, the code pattern represents a personal unlock key for unlocking a fingerprint template enrolment process.

In accordance with a second aspect of the present disclosure, a code pattern which is readable by a sensor is provided, the code pattern comprising: selectively created coding marks, such as coding dots, at a plurality of coding positions; wherein the plurality of coding positions is defined as a subset of positions in a two-dimensional matrix; and wherein said subset includes a plurality of positions which are diagonally adjacent to each other.

DESCRIPTION OF DRAWINGS

Embodiments will be described in more detail with reference to the appended drawings, in which.

DESCRIPTION OF EMBODIMENTS

Fingerprint sensing devices may be integrated into user authentication tokens, for example into smart cards. In order to personalize such a user authentication token, fingerprint reference data should be enrolled into the user authentication token. More specifically, a fingerprint template should be stored in a secure element of the token, so that—in operation—a captured fingerprint can be compared with said template in order to authenticate a user. The enrolment of fingerprint reference data is often performed under supervision in a secure environment, for example at the premises of a bank. This process is often not user-friendly and time-consuming. Thus, it is desirable to facilitate enrolling fingerprint reference data into user authentication tokens of the kind set forth.

More specifically, tokens such as smart wearables or smart cards equipped with a fingerprint-based user authentication function require the user to enroll his biometric credentials (i.e., fingerprint template) as reference data for later verification on the token. For adequate storage, the sensitive biometric credentials must be securely stored within such fingerprint-authenticated tokens. Currently, this enrolment process for payment tokens requires either an external computer, smartphone or internet connection or an enrolment at a bank branch. From a convenience perspective, it would be better to perform fingerprint enrolment on the token in a private environment, i.e. at the premises of the token holder, without compromising the security level of the token. For this purpose, a fingerprint template should be stored safely inside a secure element being embedded in such token. However, before enabling such an enrolment of a fingerprint template, the identity of the user should somehow be verified, so that the correct fingerprint template is enrolled—and not the template of a malicious person, for example when the token has been stolen. As mentioned, this identity verification is typically done at the premises of a token issuer (e.g., a bank), which is not user-friendly and time-consuming.

Thus, it is desirable to facilitate enrolling fingerprint reference data into user authentication tokens of the kind set forth. For this purpose, a personal unlock key (PUK) may be provided to a user, so that the user can unlock an enrolment function of the user authentication token. Such a PUK may be a code pattern that can be read by the fingerprint sensor and verified by the secure element. Upon a positive verification, the secure element may allow the enrolment of a fingerprint template. It may be difficult, however, to provide a reliable code pattern which is also mechanically robust. Now a method a method for providing a code pattern will be discussed, which facilitates the fabrication of a reliable code pattern which is also mechanically robust.

Figure 1:
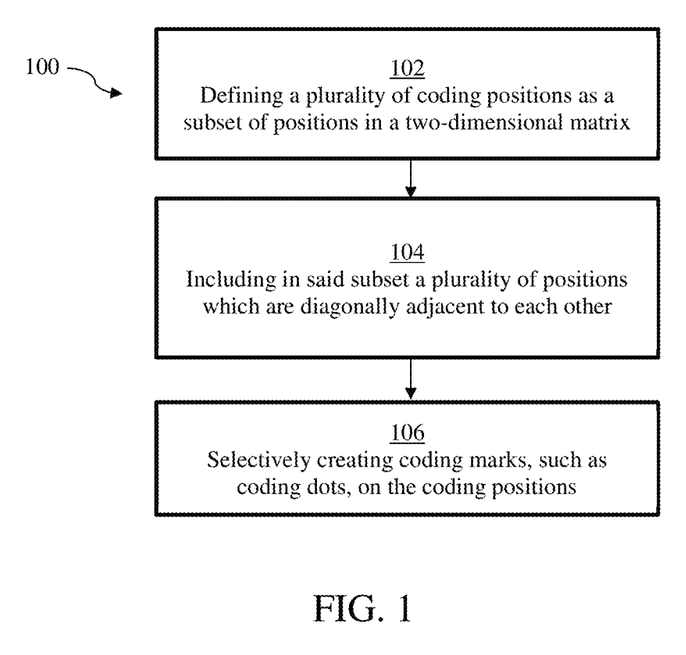
FIG. 1 shows an illustrative embodiment of a method for providing a code pattern.

FIG. 1 shows an illustrative embodiment of a method 100 for providing a code pattern which is readable by a sensor. The method 100 comprises, at 102, defining a plurality of coding positions as a subset of positions in a two-dimensional matrix. Furthermore, the method 100 comprises, at 104, including in said subset a plurality of positions which are diagonally adjacent to each other. Furthermore, the method 100 comprises, at 106, selectively creating coding marks, such as coding dots, at the coding positions. By creating coding marks at matrix positions which are diagonally adjacent to each other, the risk that the coding marks cause damage—if for example if they are created in a substrate—may be reduced, while a reliable code pattern—having for example sufficient entropy—can still be realized. It was found that diagonally adjacent coding marks cause less mechanical weaknesses than for instance vertically and horizontally adjacent coding marks in a code pattern of the kind set forth. In a practical and effective implementation, the method may further comprise avoiding that the subset contains coding positions which are vertically adjacent to each other—for example by removing one of each pair of vertically adjacent coding positions present in the subset—and avoiding that the subset contains coding positions which are horizontally adjacent to each other—for example by removing one of each pair of horizontally adjacent coding positions present in the subset. In this way, the risk that the coding marks cause damage may be further reduced.

In an embodiment, the sensor is an optical fingerprint sensor, an acoustic fingerprint sensor, or a capacitive fingerprint sensor. Furthermore, in an embodiment, the code pattern represents a personal unlock key (PUK) for unlocking a fingerprint template enrolment process. In this way, a typical fingerprint sensor which may already be present in a user authentication token, may be used to read a PUK. Subsequently, the PUK may be verified by a secure element of the user authentication token, for example, and a fingerprint template enrolment process may be initiated upon or after a positive verification of the PUK. The presently disclosed method facilitates providing a reliable and mechanically robust PUK, which can for instance be shipped to a user separately from the user authentication token.

Figure 2:
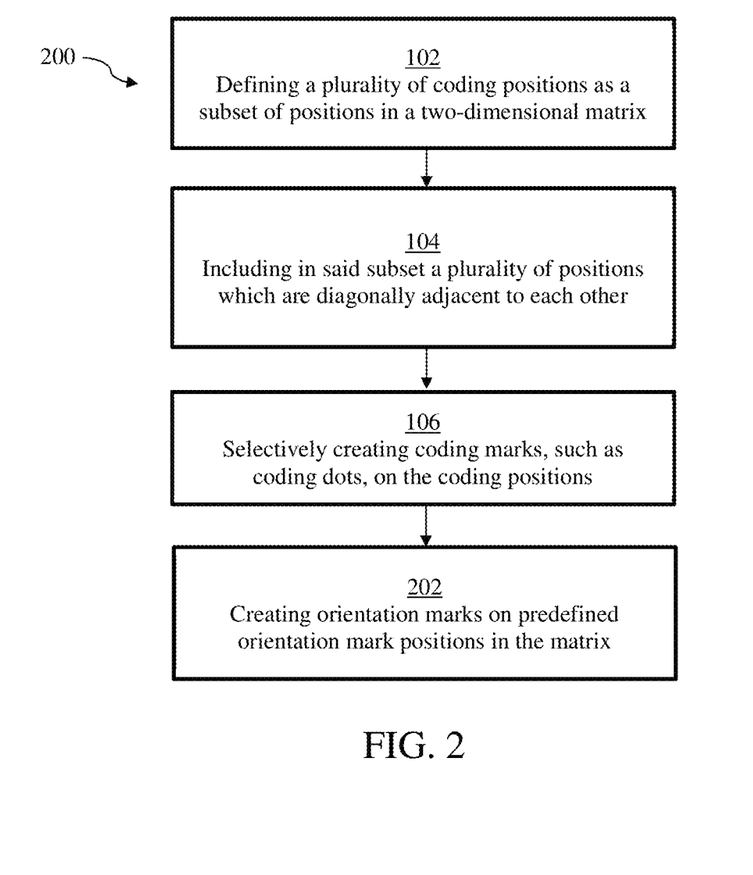
FIG. 2 shows another illustrative embodiment of a method for providing a code pattern.

FIG. 2 shows another illustrative embodiment of a method 200 for providing a code pattern which is readable by a sensor. The method 200 comprises, in addition to the steps already shown in FIG. 1, at 202, creating orientation marks at predefined orientation mark positions in the matrix. This additional step 202 facilitates detecting a two-dimensional orientation of the matrix. This, in turn, facilitates that the sensor reads the code pattern in a correct manner. In a practical and effective implementation, the predefined orientation mark positions are positions in one or more corners of the matrix.

Figure 3:
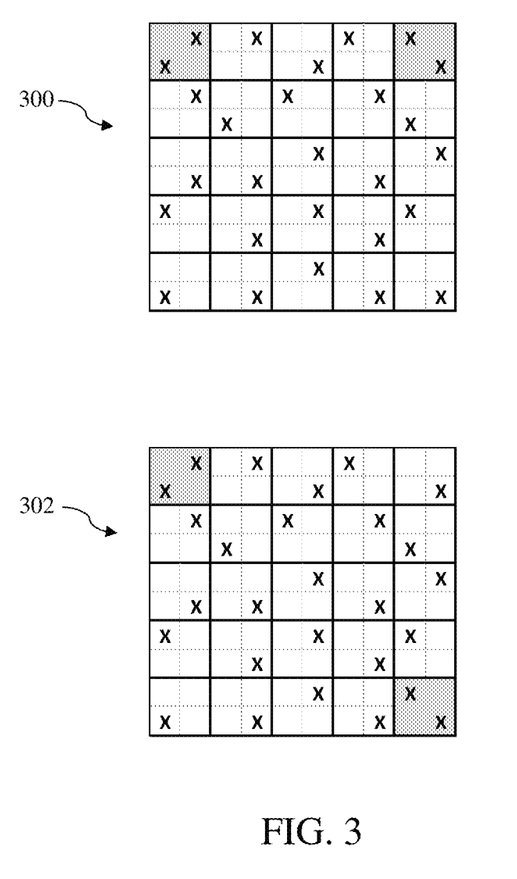
FIG. 3 shows illustrative embodiments of a code pattern.

FIG. 3 shows illustrative embodiments 300, 302 of a code pattern. As shown in FIG. 3, the code patterns 300, 302 contain coding marks at positions which are either diagonally adjacent to each other, or coding marks that are not adjacent to other coding marks. In this way, a mechanically robust code pattern may be realized. The coding marks may take the form of coding dots; coding dots are easy to produce and can be read easily by a sensor. Furthermore, the code patterns 300, 302 contain orientation marks in corners of the matrix: in the first embodiment 300 the orientation marks are created in the upper left corner and the upper right corner, and in the second embodiment 302 the orientation marks are created in the upper left corner and the lower right corner. In this way, a two-dimensional orientation of the matrix may be detected.

It is noted that the presently disclosed coding method may facilitate providing mechanically robust codes, but it also may compromise on code density. In other words, position coding—for example 1-out-of-p position coding—may be applied, which requires fewer coding dots to encode a secret than known two-dimensional codes such as Quick Response (QR) codes. A coding mark or coding dot in this context is a mark at a certain position in the matrix, which represent a part of a code. The mark itself may take the form of a changed substrate property, for example—i.e. a property of a substrate that is different, at the given position, from an unmarked part of the substrate. In other words, creating a coding mark may be implemented as creating a physical change of the substrate at a given position, in particular a physical change that can be detected by a sensor.

In an embodiment, the matrix is provided on a substrate, and the coding marks are created by creating cavities in said substrate. In this way, a reliable code can be fabricated in a cost-effective manner. In an embodiment, the matrix is provided on a substrate, and the coding marks are created by punching holes in said substrate. In this way, a reliable code having a high image contrast can be fabricated in a cost-effective manner. Furthermore, in a practical and effective implementation, the substrate comprises an aluminum tape or an aluminum sheet. Alternatively, or in addition, the substrate may comprise other metals, such as copper, brass and thin steel. For example, for widely used capacitive fingerprint sensors, a metallized flexible substrate may act as a robust and cheap substrate material for three-dimensional code patterns. Depending on the fingerprint sensor technology, the material property being sensed may differ. In case of an ultrasonic fingerprint sensor, topology-dependent acoustic travel time may be the measured property, in case of a capacitive sensor topology-dependent capacitance may be the measured property, in case of an optical sensor reflection properties may be sensed. To encode the substrate material, areas with a significant (i.e. detectable) change of the measured property may be formed on a carrier substrate. Such areas with significantly differing properties may be economically formed by low-cost methods changing the substrate's topology, for example by printing, creating cavities or punching holes into the substrate.

Creating cavities and punching holes firstly have the benefit of exhibiting a flat topology towards the sensor's sensing surface and thus they may enable an optimal coupling contact with the fingerprint sensor, and secondly the benefit of a very good image contrast. Printing is an additive method, which may be used as an alternative, but it may introduce an irregular topology, while forming a cavity may not introduce topology but it may exhibit a significantly lower contrast, depending on the depth of such cavity. The optimal method may be to punch holes into the substrate: punching may support all technologies, e.g. acoustic, capacitive and optical sensing. Thus, cavities (no through holes) and punched holes (through holes) both exhibit a flat topology towards the sensor's sensing surface and result in a good image contrast. However, compared to cavities, punched holes result in an even better image contrast: punched holes provide within the hole close to zero capacitance, while a cavity just exhibits a lower capacitance. This means that for capacitive sensors punched through holes provide a better contrast than cavities.

As fingerprint sensors exhibit a far lower resolution than e.g. mobile phone cameras or automation cameras, a QR code may not be suitable in the given context, because a QR code may not be punched at the required resolution into a mechanically stressed substrate without reducing the mechanical robustness of such a code significantly. Furthermore, a QR code has been designed for different application areas than what is required for encoding enrolment keys. A QR code is by nature designed to be captured by an optical system over a certain distance with unknown display scale. For that reason, a QR code may contain unnecessary overhead that may be required for a normal QR code use case, but that represents a burden if applied to enrolment keys. In case of fingerprint enrolment, it may be assumed that the code pattern may be coupled directly and at close to zero distance to the sensor, thus no complex alignment markers and clock recovery patterns are required. Furthermore, QR codes have been designed to provide a high code density, as relatively complex component part numbers must be encoded. In case of an enrolment key—i.e. a PUK of the kind set forth—the code length may be between 4 and 10 digits, which does not require such code density as provided by a QR code. Thus, it is desirable to apply a much simpler and more robust code than a QR code. This may be achieved by a coding method of the kind set forth, which in addition may use a plurality of coding fields and one or more check number fields as set forth hereinbelow.

Figure 4:
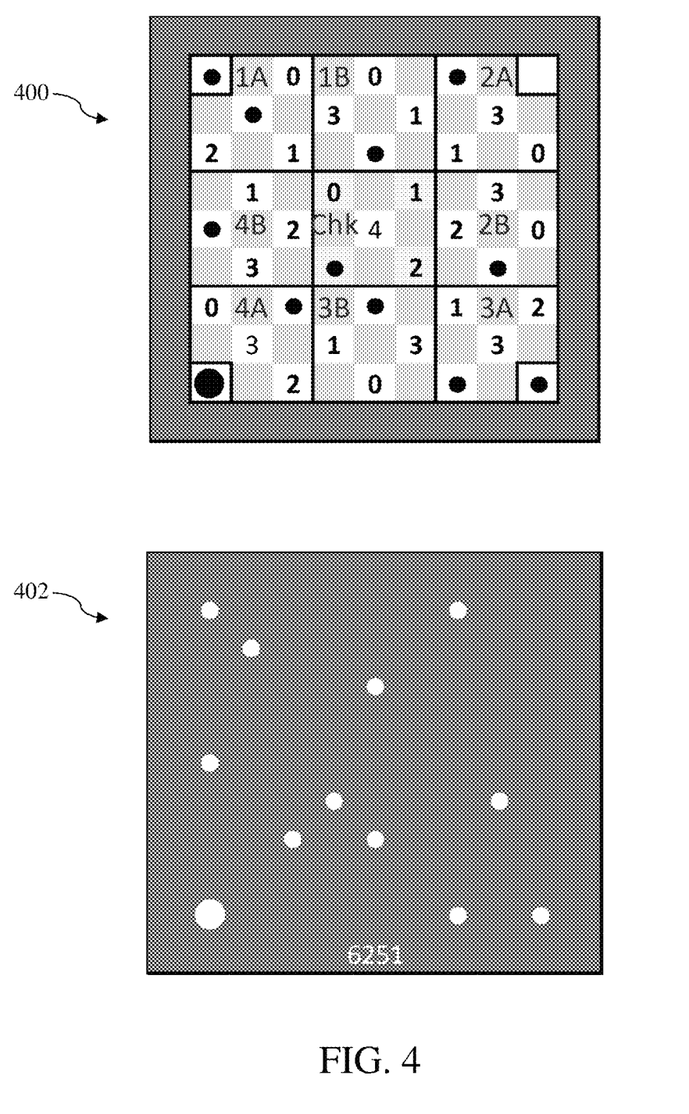
FIG. 4 shows further illustrative embodiments of a code pattern.

FIG. 4 shows further illustrative embodiments 400, 402 of a code pattern. In the embodiment 400, a predefined number of coding positions (i.e. 4 coding positions 0, 1, 2, 3) is logically grouped into coding fields (i.e. 8 coding fields 1A, 1B, 2A, 2B, 3A, 3B, 4A, 4C). Each coding field contains only one coding mark at one of the coding positions in the particular field. Furthermore, in the embodiment 400, a predefined number of coding positions (i.e. 5 coding positions 0, 1, 2, 3, 4) is logically grouped into a check number field (i.e. 1 check number field Chk). The check number field also contains only coding mark, namely at coding position 3. The check number field is placed in the center of the matrix. Generally speaking, the predefined number of coding positions in each coding field may be $p-1$, wherein p represents the base of a Galois field $GF(p^n)$, and wherein n is the number of coding fields in the matrix. Furthermore, the predefined number of coding positions in the check number field may be p. This scheme may be referred to as a 1-out-of-p position coding. As mentioned above, it requires fewer coding dots to encode a secret than known two-dimensional codes such as Quick Response (QR) codes, for example. It is noted that p equals 5 in the present example. Furthermore, from a mechanical robustness perspective, it may be desirable to reduce the number of coding dots to a minimum, as every coding dot may weaken the substrate material. For that reason, it may be of an advantage to apply a 1-out-of-p position coding for encoding a secret. A second reason for applying such position code may be to provide support for a constant image contrast, because the zero-state may also be encoded. A constant image contrast may simplify code image post-processing and thus may improve code integrity. Furthermore, it may support simple rotation detection/correction by cross-correlation, for example by a reference mask. In the present example, the coding dots may be organized in a matrix having 8 coding fields and 1 check number field. In total, the code shown in FIG. 4 comprises only 12 coding dots, spread over 8 coding fields and one check number field. For detection of code matrix rotation, the coding fields positioned in the pattern's corners may comprise additional rotation detection information (RDI). The pattern constituted by the coding dots may be mapped to a 4-digit code, for example to PUK having a value 6251 (i.e. a four-digit code). The embodiment 402 is a schematic of a code pattern that has been fabricated in accordance with the above-mentioned scheme.

Figure 5:
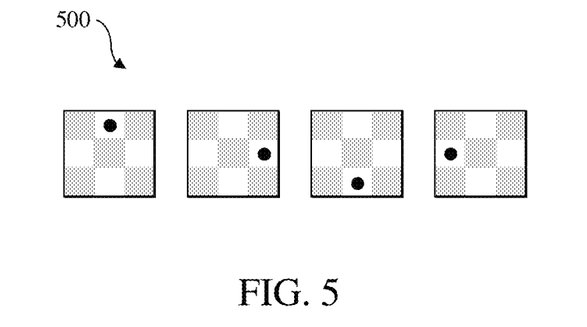
FIG. 5 shows illustrative embodiments of coding positions.

FIG. 5 shows illustrative embodiments of coding positions 500. In particular, it is shown that a coding field may contain $p-1$ coding positions, where p equals 5 in the present example. In order to produce a code pattern, one of these $p-1$ coding positions is selected, and a coding dot is created at the selected coding position. Each coding field of the matrix may contain $p-1$ coding positions, and only one coding dot may be created in each coding field, i.e. at one of said $p-1$ coding positions.

Figure 6:
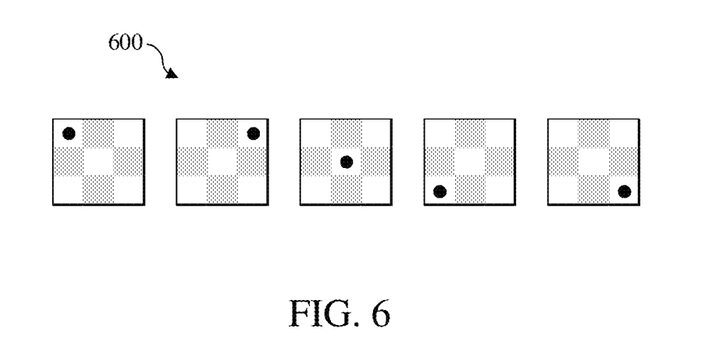
FIG. 6 shows further illustrative embodiments of coding positions.

FIG. 6 shows further illustrative embodiments of coding positions 600. In particular, it is shown that the error check field may contain p coding positions, where p equals 5 in the present example. One of these p coding positions is selected, and a coding dot is created at the selected coding position. The coding dot created in the error check field may be used for error detection purposes. The coding dot in the error check field is not part of the encoded secret, but it provides a check number that may be used to check the consistency of the PUK number after decoding. The code applied may be based on a Galois field based on a prime p. However, if all p options are applied for encoding, the check result may be ambiguous. This ambiguity may be removed by restricting the code alphabet to p−1 members. In this way, the number of code members may be made compliant with binary or decimal number systems.

Using a position code may significantly reduce the number of required coding dots, because the information may be encoded by 1-out-of-(p−1) positions, representing log(p)/log (2) bits created by a single coding dot applied to one coding field. Another advantage of a position code may be its increased redundancy which may support error detection and correction. The coding method as disclosed here may also be configured to exhibit an equal number of coding dots in the x- and y-directions.

Figure 7:
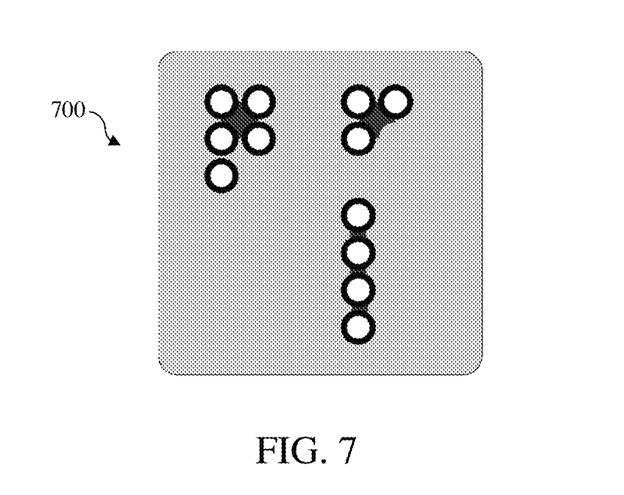
FIG. 7 shows an example of substrate damage caused by punching.

FIG. 7 shows an example of substrate damage 700 caused by punching holes in a substrate. To create mechanically robust codes that withstand mechanical stress caused for example by bending, torsion, wrapping, which may occur during shipment of the code or during punching, it may be required to either define a code for mechanical robustness by layout constraints or by excluding code combinations that may result in mechanical instability when the resulting code is applied to a metallized substrate e.g. by punching. The example shown in FIG. 7 illustrates some damages that may occur during e.g. a high-speed encoding process implemented by punching. Code configurations where coding dots are directly (horizontally, vertically) adjacent may cause mechanical damages when stress is applied to the code substrate. Diagonally adjacent coding dots are acceptable, but vertical or horizontal adjacent coding dots are preferably avoided.

Figure 8:
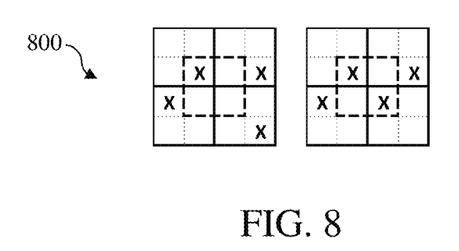
FIG. 8 shows illustrative embodiments of mechanically robust code patterns.

FIG. 8 shows illustrative embodiments 800 of mechanically robust code patterns. As shown, the code patterns contain coding marks at positions which are either diagonally adjacent to each other, or coding marks that are not adjacent to other coding marks.

Figure 9:
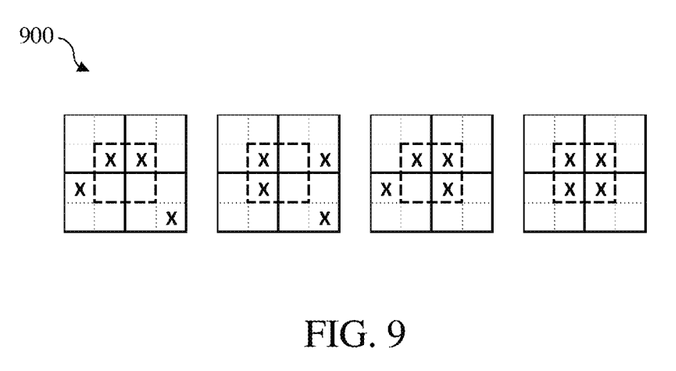
FIG. 9 shows examples of mechanically weak code patterns.

FIG. 9 shows examples 900 of mechanically weak code patterns. As shown, the code patterns contain horizontally adjacent coding marks, vertically adjacent coding marks, or both horizontally and vertically adjacent coding marks.

Figure 10:
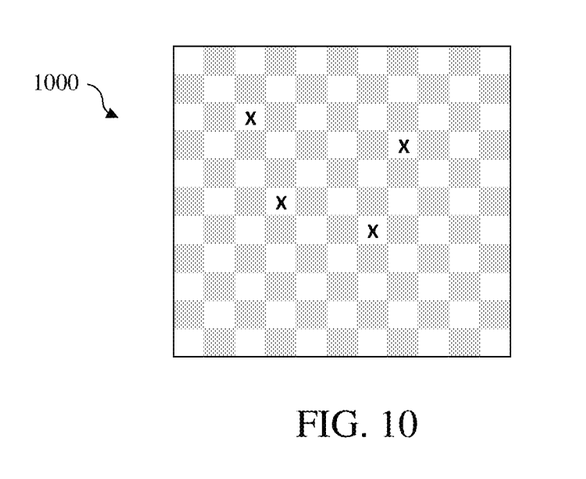
FIG. 10 shows an illustrative embodiment of mechanically robust coding positions.

FIG. 10 shows an illustrative embodiment 1000 of mechanically robust coding positions. At the expense of reduced code density, coding that may avoid mechanically critical coding configurations may be realized. In accordance with the present disclosure, coding marks may be arranged diagonally adjacent to each other. A diagonal arrangement may increase the pitch between two coding marks by √2, which has a positive impact on the mechanical stability. In accordance with the present disclosure, coding marks may only be created at coding positions which are included in a subset of matrix positions, wherein said subset only comprises diagonally adjacent positions.

Figure 11:
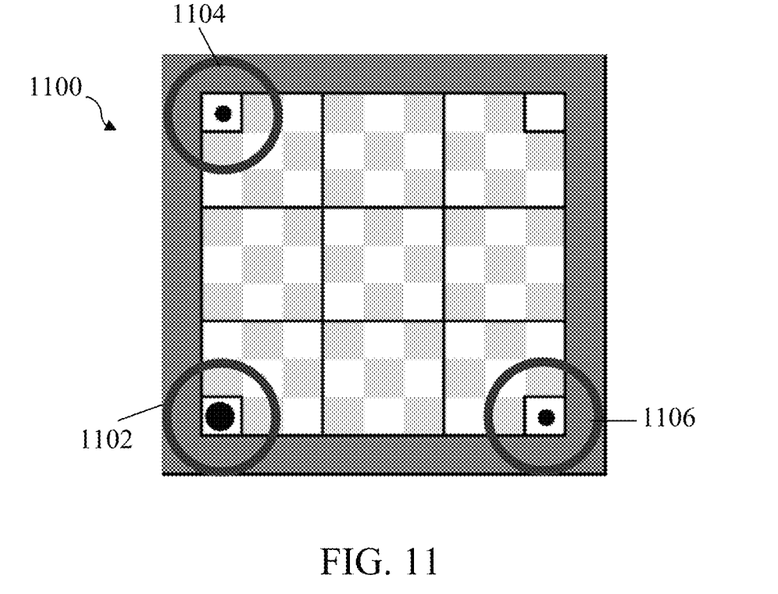
FIG. 11 shows an illustrative embodiment of a matrix with orientation mark positions.

FIG. 11 shows an illustrative embodiment 1100 of a matrix with orientation mark positions 1102, 1104, 1106. The matrix contains three orientation mark positions 1102, 1104, 1106, at which orientation marks are created. In the present example, the orientation mark at orientation mark position 1102 is larger than the orientation marks at orientation mark positions 1104 and 1106. This facilitates a better detection of the orientation of the matrix. Generally speaking, the code pattern may have been applied with unknown orientation; hence it may be required to identify the orientation of the code pattern, or more specifically of the matrix. For that reason, orientation marks (e.g. orientation dots) may be added to enable a detection of the two-dimensional orientation of the matrix. An optimal implementation of the matrix may have an odd number of columns and rows for creating orientation mark positions at the four corners of the code pattern. A configuration as shown in FIG. 11 may be used to identify the rotation of the code pattern.

As described above, coding positions may be logically grouped into coding fields. Furthermore, a check number field may be added for error detection purposes. The mapping of an enrolment key onto the position-encoded code pattern may be realized efficiently by means of an algorithmic coding mark placement. It may not be required to arrange the coding fields such that all coding fields may comprise an equal number of coding positions, but for setting up a proper code correction the groups may be made as similar as possible in number of coding positions. The example described in FIG. 4 comprises 8 coding fields and 1 check number field, wherein the coding fields comprise 4 coding positions and the check number field comprises 5 coding positions. The code as configured in this example may be used for encoding a 4-decimal enrolment key including a sum-mod(5) check number value, which may be the checksum calculated within the limited field $GF(5^8)$, wherein GF denotes a Galois field.

Error prevention, detection and correction may be provided as follows. The encoded data may be modified accidentally between the moment of its generation and the moment of its application. Especially mechanical stress or environmental conditions, such as humidity and temperature, may cause such alterations. Alterations may materialize e.g. as missing coding dots or substrate modifications being falsely interpreted as additional coding dots. Experiments have shown that the probability of errors stimulating interpretation as additional coding dots is higher than stimulating interpretation as missing coding dots. Errors that may occur are shown in Table 1.

TABLE 1

| Domain | Type | Error Detail | Error Detection |
| --- | --- | --- | --- |
| Encoding | Field Error | Encoding Error | Optical Correlation |
| Transmission | Damage | Missing Dot | Checking Code Contrast (Dots per Code) |
|  |  | Added Dot(s) | Checking Field Contrast (Dots per Field) Dot Contrast/Image Contrast |
|  |  | Modified Dot Size | Dot Contrast/Image Contrast |
|  |  | Modified Dot Position | Sum mod(p) |
| Decoding | Offset Rotation | X, Y offset Phi offset | Image Correlation, correlate Dot Contrast/Image Contrast vs Code Field Mask |

In order to avoid such code alterations, a position code may be used that may only be encoded by a single coding dot within each coding field. Another countermeasure may be keeping the number of coding dots small to avoid unnecessary weakening of the substrate material. Another countermeasure may be maximizing the gap between coding dots to avoid weakening of the substrate material. Another countermeasure may be an optimization of the size of the coding dots to stimulate an optimal imaging performance A further countermeasure may be to use a sufficiently robust metal layer for encoding; a suitable material may for example be self-adhesive aluminum tape or aluminum sheets as used, for example, for electrostatic discharge (ESD) protection.

A missing coding dot may easily be identified by counting the coding dots within the whole code or within a coding field, which must be constant (for example equal to 1). Similar is the situation of an additional coding dot being detected, which may have been caused by substrate damages. By counting the number of coding dots within the whole code or within a coding field, both error types may be detected, because the number of coding dots per code and per field are constant throughout the code space and are known by design. In conjunction with a check number, errors in single coding fields may also be corrected.

A modified coding position may represent a third error type, which may not be detected by counting the coding dots in a coding field. This error type may be identified by means of a check number. The check number generation as applied here may be based on a code alphabet that may have p code members, wherein p may be a prime number or an irreducible polynomial, which may exhibit prime-like properties. Furthermore, the total code space may be a subset of a limited field with base p, usually called Galois field GF($p^n$), with n being the number of coding fields used by the code. The $p^{th}$ element of the code alphabet may not be used for encoding coding fields, leaving p–1 code elements for coding field encoding. For the check number all code elements may be used. The conditions as outlined may require two different position codes, a 1-out-of-(p–1) code for encoding coding fields and a 1-out-of-p code for encoding the check number. In the example shown in FIG. 4, the prime number or irreducible polynomial p is chosen as 5, which results in a 1-out-of-4 position code for coding field encoding and a 1-out-of-5 position code for check number encoding.

For generation of the check number within the Galois field, a check matrix M=[1, 2, . . . , p] may be applied that may reflect the number of p coding elements used. In case the number of coding fields exceeds the number of code elements, the data to be encoded may be organized in code blocks up to a length of p coding fields. If, as an example, the number of coding fields in a code block is 4, the position coding of the $i^{th}$ coding field may be labeled $x_i$. The check number $x_{n+1}$ (the index n+1 denotes the additional field which is used as check number field) may thus be calculated as:

$$x_{n+1} = p - \sum_{i=1}^{n} M_i * x_i \bmod p - 1$$

In principle, the check number represents a weighted checksum calculated within GF($p^i$). As the code disclosed here is an image based code, the check number $x_{(n+1)}$ may be extracted from the sensed image and evaluated separately from the coding fields. For error checking of the encoded enrolment code, the following condition may be checked once the m code blocks with each n position codes from all coding fields and all check numbers have been extracted from the sensed image:

$$\left(\sum_{i=1}^{n} M_i * x_i + x_{n+1}\right) \bmod p == 0$$

If the result of the conditional check is FALSE, an error may have occurred, which may have been caused by at least one error within one field of the group of coding fields and check number field. Detectable errors may e.g. comprise a change of the position code and an exchange of two position codes. As the check number field impacts the error detection of all coding fields, it may be optimally placed in the center of the code pattern to reduce the risk of damage, which is assumed to develop with higher probability from the code's boundary to its center. Furthermore, placing the check number field into the center makes it less sensitive to rotation offsets.

After de-blocking, i.e. re-assembly of the individual coding fields from coding blocks, the decimal code y, expressed by position codes $x_i$, wherein $x_1$ denotes the top left most position code, may be calculated as:

$$y = \sum_{i=1}^{n} x_i * (p-1)^{n-i}$$

When looking at the location of coding fields, the index i may for example be increased clockwise, starting from the top left position. The position codes $x_i$ may be extracted from the code image by means of a coding map, which may assign position codes to individual coding positions; thus, the correlation of coding dots and assigned coding positions may provide the position code for that field. An example of such coding map is shown as embodiment 400 in FIG. 4. The position encoding may be realized in an efficient manner by converting the enrolment key (PUK) to a numerical code with base (p–1), and converting individual positions in code base (p–1) into position codes using a coding map. The code entropy may be represented by decimal digits as shown in Table 2.

TABLE 2

| | Generic | Example: p = 5, n = 8 |
| --- | --- | --- |
| Coding Positions | =n | =8 |
| Coding Options | =p − 1 | =4 |
| Code Bits per Field | $=\dfrac{\log(p-1)}{\log(2)}$ | =2 |
| Code Bits | $=n * \dfrac{\log(p-1)}{\log(2)}$ | =16 |
| Decimals | =log(n * (p − 1)) | =4.82 |
| Entropy | | =65536 |
| Code Range | | 0 . . . 65535 |

As indicated by example, a code based on 8 coding fields with 4 coding positions each (p=5) may result in a code that is sufficient for encoding a 4-digit enrolment key (PUK). If the entropy is not sufficient for encoding the enrolment key, the product n*(p−1) may be adjusted accordingly. It may be advantageous to select the prime number p from the set of primes {11,7,5}: larger primes may result in reduced code utilization, smaller primes may exhibit worse error correction capabilities.

Figure 12:
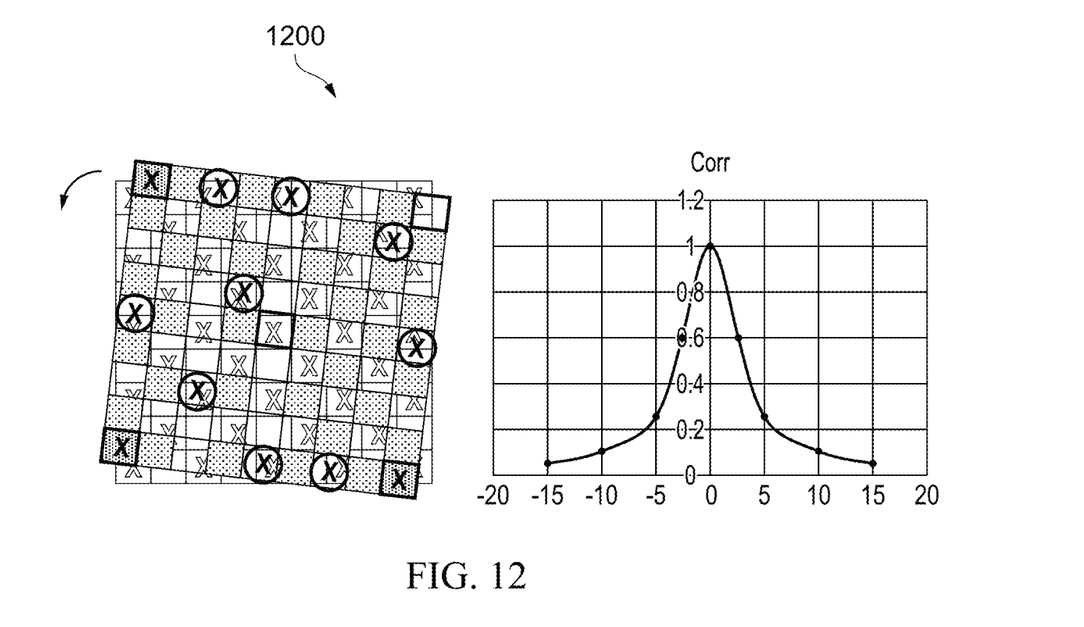
FIG. 12 shows an illustrative embodiment of rotation adjustment.

FIG. 12 shows an illustrative embodiment 1200 of rotation adjustment. As mentioned above, the code pattern may be applied to the sensor with an unknown orientation. For a coarse identification of code rotation, the code may comprise rotation detection dots (i.e. orientation dots) in 3 of 4 corner positions as shown in FIG. 11. Furthermore, the rotation detection dot marking the grid origin may differ in diameter from other dots to make it recognizable. A fine rotation adjustment may be achieved by cross-correlating the rotated code with a reference grid, for example having coding dots at all feasible coding positions. Based on the correlation result either the sensed code image or the reference image is adjusted in a processing loop until the correlation between the two is maximal—at that stage it may be assumed that both matrices are aligned. The code image may be shrunk by up to ~30% to support rotation by an arbitrary angle. According to the maximum allowed rotation error, the code matrix may be shrunk. By shrinking it may be ensured, that the rotated code image may be completely overlapped by the sensor's active sensing area.

Figure 13:
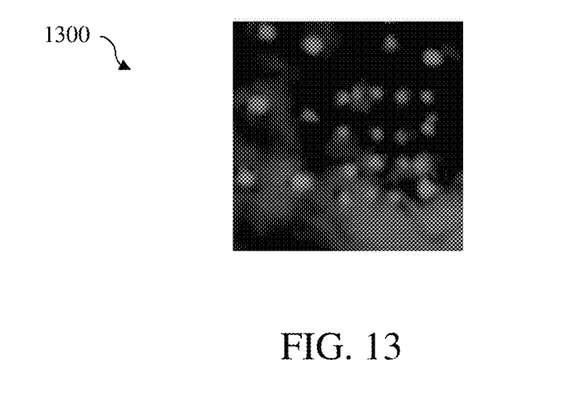
FIG. 13 shows an illustrative embodiment of a fabricated code pattern.

FIG. 13 shows an illustrative embodiment 1300 of a fabricated code pattern. In particular, a code sample experimentally created from a metallized ESD-tape is shown, wherein the image is as provided by a fingerprint sensor driver after application of filtering and contrast enhancement operations. For decoding, all filtering and image enhancement operations may be switched off to avoid destruction of information content.

It is noted that the code matrix configuration may differ from a 9×9 matrix organization. For example, also non-square configurations may be supported. Furthermore, in some embodiments, the data payload may be distributed over multiple coding blocks encoded by a subset of all coding fields. The position codes of one of the code fragments may additionally be marked by suitable means representing the upright position—marking may e.g. be achieved by applying the (p−1)-complement-function, which causes the error check involving the check number to indicate an error. In case of such an error, it may firstly be assumed to be the upright positioned code fragment, if it may be read after applying the reverse function of the function applied for marking. In one example for p=5, skipping one code resulting in 1-out-of-4, a position code of x=3 may be converted into x=(4−1)−3=0.

In some embodiment, the coding dots may be printed on a conductive substrate by ink-material deviating significantly in the physical properties being measured by the fingerprint sensor for free air, thus creating positions of high luminance and thus forming an inverted code pattern image compared to a code implemented by punched coding dots. In some embodiments, the substrate layer and the coding dots may be formed by e.g. laser-printing the substrate definition in a first printing step and the dot definition in a second printing step, wherein the toner particles may form dots deviating from the measurable properties of free air. At coding dot positions, a higher luminance may be sensed compared to locations without coding dots due to a smaller distance between dot top and sensor. Furthermore, in some embodiments, the coding dots may be printed by a 3D-printer on a suitable substrate, wherein the coding dots may be deviating significantly in physical properties from that of free air, thus creating positions that may be sensed by higher luminance, and thus forming an inverted code pattern image. In other embodiments, coding cavities may be formed in a suitable substrate by impact printing, wherein the cavities may exhibit the physical properties of free air rather than those of the surrounding substrate. In some embodiments, an error correction method other than "summod(p)" or checksum in a Galois field GF(p") may be applied. In some embodiments, a coding field may comprise a number of coding positions that may differ from the number of four.

In some embodiments, a coding field may comprise a number of coding positions that differ from the number of four and a coding field may contain more than one coding dot. In some embodiments, a coding field may be organized as 2×3 coding positions and a Braille number code may be used for coding field encoding. In these embodiments, the method for generating check numbers and the number of check number Fields may be arranged such that error correction of at least 1 coding field may be achieved. In other embodiments, the code matrix area may be surrounded by a bezel interface frame, which may provide operational coupling with the bezel of a capacitive fingerprint sensor, thereby enabling good code image readability. In other embodiments, the coding dots may not be restricted to positions on diagonal lines and mechanically instable position codes may be skipped, thereby increasing code density.

In other embodiments, if rotation indicator dots with sequence "set, set, set, unset" are used, the corner field having the indicator dot unset may be used to encode by two coding dots on the available four coding positions, thus making the number of coding dots equal for all corner coding fields.

$$i = \frac{(p-1)*(p-2)}{2}$$

In case p=5 the value for i may be calculated as:

$$i = \frac{(5-1)*(5-2)}{2} = 6$$

Figure 14:
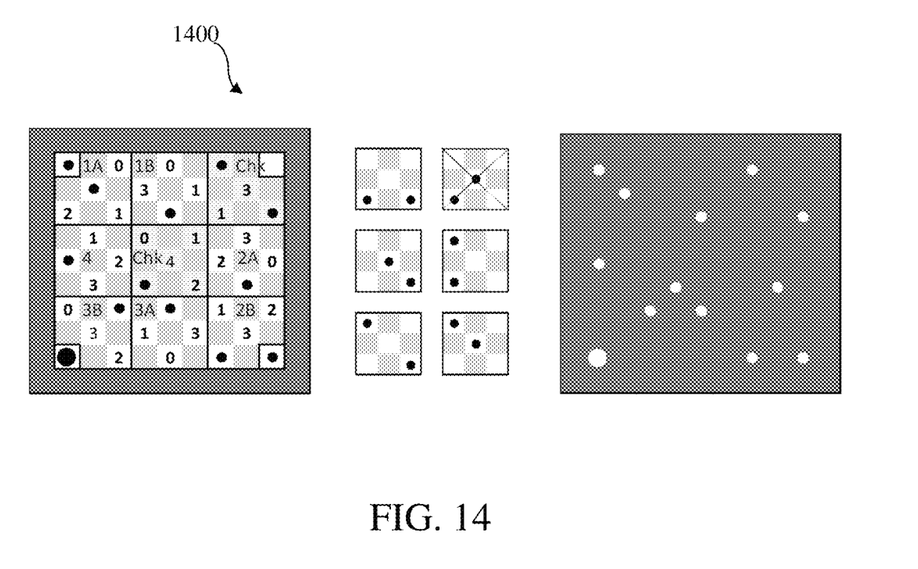
FIG. 14 shows an illustrative embodiment of a code pattern with an additional check number field.

FIG. 14 shows an illustrative embodiment of a code pattern with an additional check number field. Skipping for this coding field the (i-p) position codes that may reduce the mechanical stability at most, p coding positions may remain available; thus, this coding field may be used for encoding an additional check number that may be useful when organizing the coding fields in more than one coding blocks. In the example shown in FIG. 14, a coding position has been skipped which does not comprise coding dots on the code perimeter. Thus, rotation alignment may be supported if at least one coding dot may be positioned on the code perimeter. For this embodiment, the number of coding dots may increase by one while the code entropy may be reduced by a factor of (p−1). In case of p=5, the code entropy may be 14 bits, which may be sufficient for encoding a 4-digit PUK. Thus, this code configuration may provide an optimal code utilization for a 4-digit PUK while also providing optimal error detection and error correction capabilities.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 method for providing a code pattern
102 defining a plurality of coding positions as a subset of positions in a two-dimensional matrix
104 including in said subset a plurality of positions which are diagonally adjacent to each other
106 selectively creating coding marks, such as coding dots, on the coding positions
200 method for providing a code pattern
202 creating orientation marks on predefined orientation mark positions in the matrix
300 code pattern
302 code pattern
400 code pattern
402 code pattern
500 coding positions
600 coding positions
700 substrate damage caused by punching
800 mechanically robust code patterns
900 mechanically weak code patterns
1000 mechanically robust coding positions
1100 matrix with orientation mark positions
1102 orientation mark position
1104 orientation mark position
1106 orientation mark position
1200 rotation adjustment
1300 fabricated code pattern
1400 code pattern with additional check number field

The invention claimed is:

1. A method for providing a code pattern which is readable by a sensor, comprising:
  defining a plurality of coding positions as a subset of positions in a two-dimensional matrix;
  including in said subset a plurality of coding positions which are diagonally adjacent to each other and a plurality of coding positions that are not adjacent to other coding positions;
  removing one coding position of a pair of coding positions in the subset that are vertically adjacent to each other;
  removing one coding position of a pair of coding positions in the subset that are horizontally adjacent to each other; and
  selectively creating coding marks only at the diagonally adjacent coding positions and at the coding positions that are not adjacent vertically or horizontally to other coding positions.

2. The method of claim 1, further comprising creating orientation marks at predefined orientation mark positions in the matrix.

3. The method of claim 2, wherein the predefined orientation mark positions are positions in one or more corners of the matrix.

4. The method of claim 1, further comprising logically grouping a predefined number of coding positions in one or more coding fields.

5. The method of claim 4, wherein the predefined number of coding positions in each coding field is p−1, wherein p represents the base of a Galois field GF(p″), and wherein n is the number of coding fields in the matrix.

6. The method of claim 4, wherein at most one coding mark is created in each coding field.

7. The method of claim 4, further comprising logically grouping a predefined number of coding positions in a check number field.

8. The method of claim 7, wherein the predefined number of coding positions in the check number field is p, wherein p represents the base of a Galois field GF(p″), and wherein n is the number of coding fields in the matrix.

9. The method of claim 7, wherein the check number field is placed in the center of the matrix.

10. The method of claim 1, wherein the matrix is provided on a substrate, and wherein the coding marks are created by creating cavities in said substrate.

11. The method of claim 1, wherein the matrix is provided on a substrate, and wherein the coding marks are created by punching holes in said substrate.

12. The method of claim 10, wherein the substrate comprises an aluminum tape or an aluminum sheet.

13. The method of claim 1, wherein the sensor is an optical fingerprint sensor, an acoustic fingerprint sensor, or a capacitive fingerprint sensor.

14. The method of claim 1, wherein the code pattern represents a personal unlock key for unlocking a fingerprint template enrolment process.

15. A code pattern which is readable by a sensor, the code pattern comprising:
  selectively created coding marks at a plurality of coding positions;

wherein the plurality of coding positions is defined as a subset of positions in a two-dimensional matrix;

and wherein said subset of positions only includes a plurality of coding positions which are diagonally adjacent to each other and a plurality of coding positions that are not adjacent to other coding positions either vertically or horizontally.

\* \* \* \* \*